Figure 1:
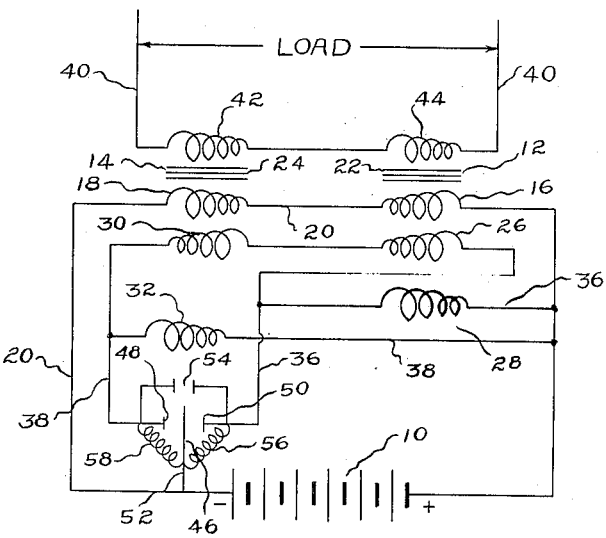

Nov. 19, 1940.  T. F. CARMICHAEL  2,222,214
POWER CONVERTING UNIT AND SYSTEM
Original Filed June 1, 1936

Inventor
T. Frazer Carmichael
By Beaman & Langford
Attorney

Patented Nov. 19, 1940

2,222,214

UNITED STATES PATENT OFFICE 2,222,214

POWER CONVERTING UNIT AND SYSTEM

T. Frazer Carmichael, Plymouth, Mich., assignor to Beaman & Langford, Jackson, Mich., a copartnership consisting of Townsend F. Beaman and G. Frank Langford, Trustee Application June 1, 1936, Serial No. 82,813
Renewed October 12, 1939

6 Claims.  (Cl. 175—363)

The present invention relates to improvements in electrical power converting circuits. In the illustrated application of the principles of the invention herein specifically treated, the circuit is used for transforming a low potential input current to produce output current at high potential capable of lighting neon gas tubes and the like of any usual length and with a smooth and steady glow.

Heretofore it has been proposed to utilize a six volt storage battery, as conventionally used in the starting and lighting circuits of automotive vehicles, for the source of input current and through suitable magnetic or motor driven interrupter or the like induces a current of high potential in the secondary. U. S. patents to Pettit, No. 1,996,212, and to Stowell, No. 2,000,868, are considered to be typical examples of such proposals. While it is possible to light a neon gas tube as disclosed in these patents, from a commercial consideration they have not been found generally acceptable as the amount of current passed through the magnetic interrupter results in short life and frequent servicing of the interrupter while the expense and bulk of the motor interrupter limits its field of application.

The present invention has as one of its fields of application and it is particularly concerned with the provision of an inexpensive and compact unit for utilizing the six volt storage battery of an automobile to light with a steady and brilliant glow neon gas tubes used for signaling and warning purposes, advertising and the like. While in my improved circuit an interrupter or an oscillator of some suitable construction is employed as an exciter for the direct current, the current through the excited circuit is in the order of one fourth to one-half ampere which is insufficient to be detrimental to the life of the interrupter or oscillator. In making it possible to use the low amperage stated in the excited circuit and yet have adequate output current of high potential, I have made what appears to be a very radical departure from prior practices.

When broadly considered one of the objects of the present invention contemplates the obtaining of output currents of desired potential and of alternating characteristics in the secondary circuit of a transformer unit through the employment of a primary circuit including an interrupted direct current winding and an uninterrupted imposed direct current winding. Another object of the invention resides in a secondary circuit of high potential current having its windings in series upon separate distinct zones of magnetic flux, the windings of the secondary being parallel with corresponding primary windings of alternately excited circuits whereby the complete cycle of the induced electrical wave in the secondary circuit is built up by accumulative action. A further object resides in a power converting circuit in which the excitation of the interrupter circuit in the primary is amplified by an associated direct current primary winding.

These and other objects and advantages of the present invention will be more fully discussed hereinafter and will be apparent to those skilled in the art. The invention is clearly defined in the claims and it is not my desire to be limited to the illustrated circuits disclosed in the accompanying drawing wherein—

Figure 2:
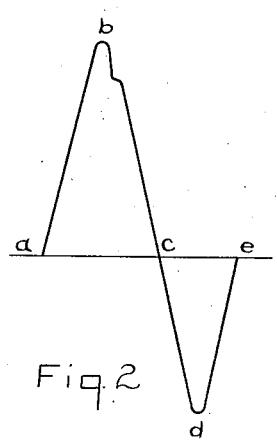
Figure 4:
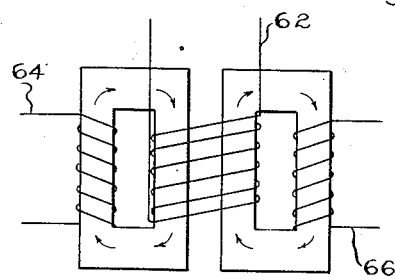
Figure 3:
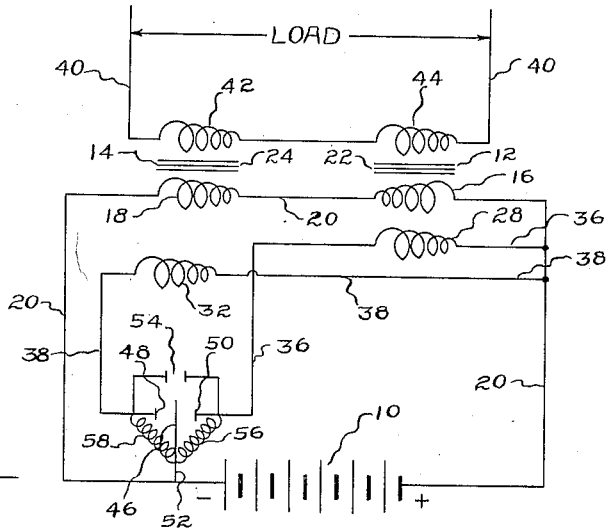

Fig. 1 is a schematic representation of my preferred circuit embodying the principles of the invention, Fig. 2 is illustrative of the complete cycle of the induced wave in the secondary, Fig. 3 is a view similar to Fig. 1 of a slightly modified circuit, and Fig. 4 is a diagrammatic representation of the transformer unit disclosing one way in which the primary and secondary windings may be applied.

Referring to Fig. 1 a suitable source of direct current is indicated at 10 and may be an ordinary six volt storage battery with positive and negative poles as labeled. A transformer unit illustrated as two separate and distinct transformers generally indicated as 12 and 14 consist of primary windings 16 and 18 in series located in the uninterrupted direct current circuit 20. The soft iron cores 22 and 24 may be of the closed type and of laminated construction. Also wound upon the core 22 are primary windings 26 and 28 and upon the core 24 primary windings 30 and 32. The windings 26 and 30 are in series and are located in a shunted circuit around the interrupter generally designated by reference character 34. The windings 28 and 32 are in parallel across the poles of the battery and are located in the interrupter circuits 36 and 38 respectively. In the output circuit 40 the secondary windings 42 and 44 of the transformers 12 and 14 are in series. In the diagrammatic showing of the windings of the primary and secondary circuits the graduation of the convolutions denotes the inside and outside windings of the coils. For example the secondary windings 42 and 44 and inside end is connected to the outside end; in the primary windings 16 and 18 the inside ends are connected together. Any suitable interrupter or oscillator, magnetic or otherwise, may be used for interrupting or pulsating the direct current for obtaining the required excitation. As diagrammatically shown in Fig. 1, a metallic reed 46 of a full wave magnetic interrupter is caused to vibrate in a well known manner between the contacts 48 and 50 to alternately open and close the circuits 36 and 38 through the common conductor leading to the battery. A condenser 54 bridges the contacts 48 and 50 and functions as an alternating current conductor. Alternating current resistances 56 and 58 in the form of iron core chokes connect the common conductor 52 into the circuits 36 and 38. These resistances function to increase the life of the interrupter as they permit direct current to flow to the battery during a part of each cycle without passing through the interrupter.

Without limiting the scope of the invention in any manner as the size of conductors and number of turns in the primary windings may be varied to suit the secondary load requirements, a very satisfactory construction for lighting usual lengths of neon gas tubes is as follows: the windings 16 and 18 of one hundred fifty turns of No. 30 wire; the windings 26 and 30 of forty-eight turns of No. 18 wire; and the windings 28 and 32 of twenty-four turns of No. 28 wire. The character of the secondary windings 42 and 44 will depend upon the load requirement and will be calculated in a well known manner.

Through the employment of an oscillograph and the usual current and voltage testing instrument the following appears to be a correct explanation of my improved power converting circuit: The primary windings 16 and 18 of the uninterrupted direct current circuit 20 seems to have the effect of amplifying or increasing the excitation applied to the primary windings 28 and 32 located in the interrupter circuits 36 and 38. In addition, the uninterrupted direct current in the windings 16 and 18 causes a direct current to flow in the primary windings 26 and 30 which amplifies the alternating current effect on the winding 30 during the period of excitation of the winding 28 and on the winding 26 during the period of excitation of the winding 32. During one-half of the excitation period as for example during the excitation period of the winding 28, a direct current flow occurs across the alternating current resistance 58 toward the negative pole of the battery and at the same time alternating current flows through the alternating current conductor or condenser 54. During the remainder of the period of excitation involving the winding 32 similar conditions exist in the resistance 56 and condenser 54. Excitation of the winding 28 causes an induced current of alternating quality to flow in the opposite direction in the windings 26 and because of the opposed effect of the winding 16 upon the winding 26 a direct current is caused to flow in the windings 26 and 30 toward the negative pole of the battery during the period of travel of the reed 46 between the contacts 50 and 48 as well as when the reed 46 engages the contact 48. Similarly excitation of the winding 32 has the same effect in the opposite direction when the reed 46 is traveling from the contact 48 to the contact 50 and upon engagement with the contact 50.

The amplification of the excitation of the primary winding 28 by the uninterrupted direct current primary winding 16 is thought to cause a greater flux flow in similar directions so as to step up the cycle induced in the secondary winding 44. At approximately the same time the excitation of the primary winding 30 is being amplified by the primary winding 18 to cause a similar step up in the secondary winding 42, and the combination of the cycles induced in the secondary windings 42 and 44 produce a single uniform half cycle wave such as defined by a—b—c in Fig. 2. The other half of the cycle defined by c—d—e is induced in the secondary windings 42 and 44 during the excitation of the primary winding 32.

It is not necessary that my improved converting circuit in its preferred form include two separate and distinct transformers, as it is entirely feasible to have a single transformer with two magnetic circuits. For this reason in the claims where reference is made to two transformer units it is intended to include a single transformer unit of a design capable of functioning in the manner of two separate units. Also, it is to be understood that the use of vacuum tubes of suitable construction capable of interrupting or causing a direct current in passing to oscillate may be used in lieu of the magnetic reed 46. Furthermore, with reference to the field of application, the principles of the present invention are in no sense limited to the lighting of neon gas tubes. The primary winding of the interrupted and uninterrupted circuits may be rearranged in various formations for use in any full or half way operation requiring flux flow of large magnitude and a complete cycle.

In the circuit shown in Fig. 3, the primary windings 26 and 30 in series with each other and alternately in series with the principally excited primary windings 28 and 32 have been omitted. With this arrangement quite satisfactory lighting results have been obtained and of a commercially acceptable character although the operation of the circuit shown in Fig. 1 has proven somewhat superior and is preferred. Nevertheless, I wish to include as part of my invention broadly the amplifying, by the use of a direct current primary winding, of the excitation of an interrupted or oscillating primary circuit in which there is but a single excited primary winding.

As heretofore stated, the power input into the excited circuit through the interrupter 34 is in the order of one-fourth to one-half amperes for brilliant lighting of neon gas tubes of usual lengths. By reducing the amperage to this extent over prior practices and amplifying the excitation by means of uninterrupted direct current primary windings the interrupter is capable of extended services with uniform action. It has also been observed that by reducing the resistance in the uninterrupted direct current circuit 20 the brighter the neon gas tube glows, indicating more current of higher potential in the secondary and that less current is drawn from the power input source.

In Fig. 4 a transformer is shown in which there are two separate magnetic circuits or flux track in the direction of flow represented by arrows and in opposite direction. The secondary circuit of the figure is generally indicated at 62 while the primary circuits including the windings 18—30—32 and the windings 16—26—28 are generally indicated at 64 and

66, respectively. With the circuits shown in Figs. 1 and 3 a pulsating current is induced and caused to flow in the direct current circuit 20. This current in turn appears to produce a similar pulsating current flow in the secondary winding. As it is obvious that the pulsating direct current circuit 20 has a field of application other than for inducing currents in a secondary of a transformer circuit I wish to claim this feature of the invention broadly.

Having described my invention, what I claim and desire to protect by Letters Patent is:

1. A system for producing, from a low potential source of direct current, a current of high voltage and of alternating character comprising a source of low potential direct current, a transformer unit including an uninterrupted direct current primary winding connected to said source, and a periodically interrupted current primary winding likewise connected to said source, said uninterrupted direct current primary winding functioning to amplify the excitation of said interrupted current primary winding whereby induced waves of large magnitude and complete cycle are obtained in the output circuit of said transformer.

2. A system for producing, from a low potential source of direct current, a current of high voltage and of alternating character comprising a source of low potential direct current, a transformer unit having a plurality of magnetic circuits, including an output circuit having a plurality of secondary windings in series in said magnetic circuits, a plurality of alternately excited primary windings in circuit with said source and in said magnetic circuits, and a plurality of uninterrupted primary windings likewise in said magnetic circuits and connected to said source, said direct current primary windings functioning to amplify the excitation of said excited primary windings whereby induced waves of large magnitude and complete cycle are obtained in said output circuit.

3. A system for producing, from a low potential source of direct current, a current of high voltage and of alternating character comprising a source of low potential direct current, a transformer unit having primary windings carrying uninterrupted direct current and separate primary windings carrying periodically interrupted current, said windings being in circuit with said source, the excitation of said primary windings being augmented by the uninterrupted direct current.

4. A system for producing, from a low potential source of direct current, a current of high voltage and of alternating character comprising a source of low potential direct current, a transformer unit including a plurality of alternately excited primary circuits connected across said source, means for alternately exciting said circuits, and an uninterrupted direct current primary circuit likewise connected across said source with its windings in series and in the same magnetic circuit as said excited primary circuits.

5. A system for producing, from a low potential source of direct current, a current of high voltage and of alternating character comprising a source of low potential direct current, a pair of transformers having a first set of primary windings in series with each other and located in a first circuit carrying uninterrupted direct current from said source, a second set of primary windings located in a second and third circuit connected across said source, means for alternately interrupting the current in said second and third circuits, a third set of primary windings in series with each other in a fourth circuit and alternately located in series with the primary windings of said second set, all of said sets of primary windings being divided between said pairs of transformers, and an input circuit including secondary windings in series likewise divided by said transformer.

6. A system of altering the characteristic of output of a direct current source comprising a first circuit connected across said source carrying uninterrupted current, a second circuit likewise connected across said source, an interrupter in said second circuit, a magnetic circuit common to said first and second circuits, said circuits being associated in a manner inducing a pulsating current flow in said first circuit.

T. FRAZER CARMICHAEL.